2,638,790

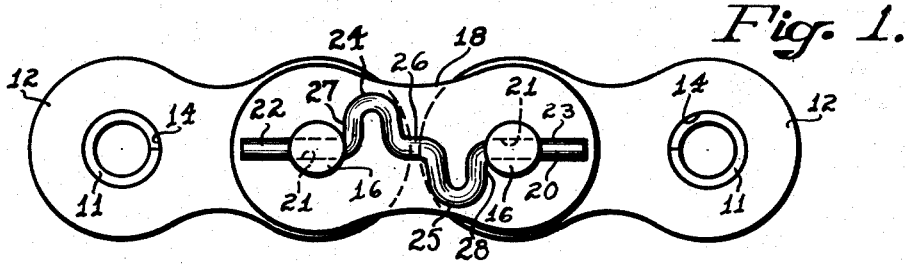
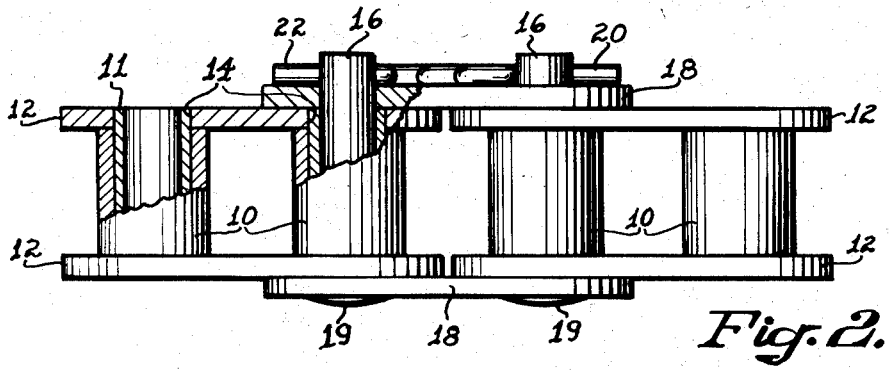
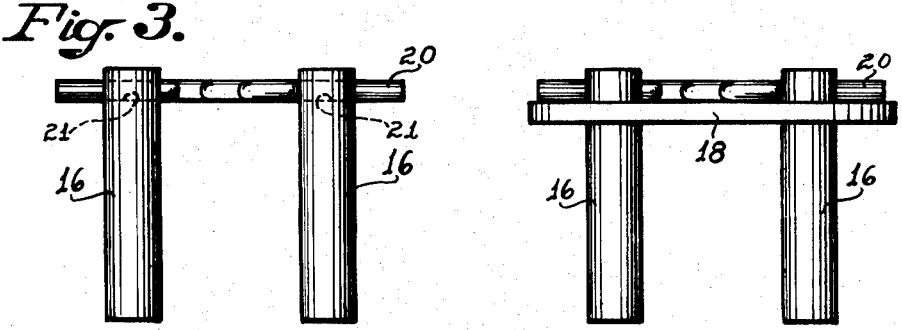
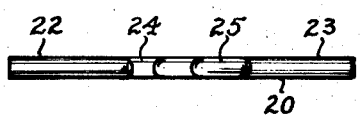
Inventor
Emil E. Perron
By Clayton T. Jenks
Attorney Patented May 19, 1953

UNITED STATES PATENT OFFICE 2,638,790

ROLLER DRIVE CHAIN

Emil E. Perron, Worcester, Mass.

Application October 21, 1950, Serial No. 191,454

2 Claims. (Cl. 74—254)

This invention relates to a roller drive chain and more particularly to a chain made up of linked roller units secured together by further links and pintles passing through the adjacent rollers.

A roller drive chain of the type illustrated in the drawings comprises a series of connected roller units, each of which has two rollers mounted on axially parallel bushings carried by side links, the units being connected in the chain by means of outer links and pintles passing through the rollers. In standard constructions, the pintles have been held in place by means of a head at one end and a cotter pin or a clip at the other end. A common form of cotter pin used to hold each pintle separately in place comprises a U-shaped soft wire having an eye at one end terminating at the other end in half round legs which in its assembled position forms a two-part cylindrical pin. That cotter pin, however, does not prevent the pintle from turning within its bushing and so is subject to wear and breakage and may let the chain link fall off with attendant disaster. When the pin is passed through both pintles, it is still subject to wear and breakage due to the separate halves bending or being cracked or snapped off where bent to lock the parts in place.

Cotter pins have also been made of various other shapes arranged to connect together the ends of two adjacent pintles and thus prevent their turning, but these pins are intended to be easily removed and so may become dislodged and cause trouble. Clips have been so shaped as to engage a groove on the end of the pintle, but such clips may be snapped out of position accidentally, and they do not prevent the pintles from turning and so are subject to wear that ultimately lets the pintle become loose. Such constructions of the prior art have in many cases depended upon a rapid assembly as well as removability of the pin or the clip so that the chain may be easily repaired when the clip is broken. However, that intended advantage has actually proven to be a disadvantage, as will be more readily apparent from the following disclosure.

The primary object of my invention is to fasten the pintles together by a cotter pin which can be readily assembled and yet is not removable except by breakage, and wherein the pin is so constructed and arranged as to prevent the pintles from turning and at the same time hold them in a correct assembly.

A further object of my invention is to satisfy such desired ends and to provide a construction which is simple and easily manufactured and assembled and yet which is not readily removed and so will hold the side plates in proper relationship for a long life of useful service. Other objects will be apparent in the following disclosure.

Referring to the drawings, illustrating one embodiment of this invention:

Fig. 1 is an end view of two roller link units connected by my special cotter pin and link construction;

Fig. 2 is a view taken at right angles to that of Fig. 1;

Fig. 3 illustrates the first step of assembling the cotter pin and pintles;

Fig. 4 shows the second step of assembling, in which one of the side plates is put in position; and Figs. 5 and 6 are two nearly full-size views at right angles to each other of the cotter pin employed in this roller link construction.

A roller drive chain of the type illustrated is made up of a series of roller units connected together in a chain formation by a cotter pin and pintle construction. Each of these units has two rollers 10 mounted on inner bushings 11 which are secured to two inner side plates or links 12. These bushings have concentric cylindrical inner and outer surfaces and they fit tightly within the axially aligned cylindrical holes 14 in the two opposite links 12. The plates 12 are so spaced that the rollers 10 may turn readily but without material end play.

The major feature of my invention involves securing adjacent pairs of roller link units together and thus making a long length of chain. This construction comprises two axially parallel cylindrical pintles 16, which rotatably fit within the two adjacent bushings 11. They project as illustrated for the purpose of securing in place two outer link members 18 which determine the spacing of the pintles and the chain units. These links 18 have cylindrical holes therethrough which rotatably interfit with the pintles 16, and these holes are so spaced that the adjacent rollers 10 of the left- and right-hand units are spaced the same as the two rollers of each unit, as is required by the driving sprocket. Each pintle 16 is of such a length and so constructed that it may be provided with a head 19 at one end which holds the adjacent outer link 18 in place, shown as the bottom one in Fig. 2. This head may be formed after the parts have been assembled by suitable means which rivets or spreads the projecting head portion and prevents removal of the link 18. The other link 18 (the top one in Fig. 2) is held in place by means of a cotter pin 20 of my special construction which fits within aligned diametrical holes 21 through the pintles. These holes are so located when the cotter pin is in place that the pin will lie snugly against the adjacent outer link 18. The cotter pin is made long enough so that after it has been assembled in the holes 21 of the two adjacent pintles, it will extend well beyond the same so as to avoid any possibility of accidental removal.

The pin 20, as shown particularly in Figs. 1, 5 and 6, comprises two straight aligned cylindrical end portions 22 and 23 of a steel wire of suitable composition and size, which are arranged to fit snugly within the cylindrical holes 21 of the pintles. Each cotter pin has two U-shaped portions 24 and 25 connecting with the straight end portions 22 and 23, and these U-shaped parts 24 and 25 are preferably joined by an intermediate straight portion 26 which is axially aligned with the cylindrical end portions 22 and 23. The U-shaped parts 24 and 25 have their arms 27 and 28 substantially parallel and fairly close together, as shown, and they are made substantially perpendicular to the center line of each of the parts 22 and 23. The curved intersection between each arm 27 or 28 and the straight part 22 or 23 has a short radius so that when assembled the cylindrical surface of the pintle 16 will lie substantially in contact with the straight arm portion. The shoulders formed by these arms prevent endwise motion of the cotter pin relative to the pintles, and because of the resiliency of the pin, any tendency for the pintle to rotate is resisted by the U-shaped part which thus urges the pintle into a definite position and insures that it will not rotate materially under the stresses involved as the roller chain is driven. The cotter pin is made preferably of a soft steel of suitable composition for the shaping operation, and the shaped product may be hardened or otherwise treated so as to provide a satisfactory strength and resiliency.

Once the pin has been assembled, it cannot be disassembled at will. The assembly of the chain parts may be accomplished by the following general procedure. The two pintles 16 are first assembled relative to the cotter pin 20, as shown in Fig. 3. Then one plate 18 (Fig. 4) is mounted on the pintles and driven into place until it lies snugly in contact with the cotter pin. It will be observed that the U-shaped portions 24 and 25 of the cotter pin are necessarily oriented so that they lie snugly against the adjacent flat face of the outer link 18. Thereafter, each of the two adjacent roll units is put into place by mounting the adjacent rollers 10 on the pintles 16, as shown in Fig. 2. Then the other outer plate 18 (the lower one in Fig. 2) is put into place, and the heads 19 are riveted or otherwise formed on the adjacent ends of the pins 16. This is the final step, since the links have to be assembled from the cotter pin end of the pintle. If occasion arises which requires removal of a roller or link, this is done by breaking the cotter pin and forcing the two pin parts out of their pintle holes, after which the pintles may be driven out in the downwardly direction of Fig. 2 and new pintles and cotter pins provided for reassembly.

The operation and utility of the device will be apparent. This cotter pin, pintle and link assembly is such that the chain may serve normally as a sprocket driven power transmitting device, in which the cotter pin 20 in its association with the links 18, the pintles 16 and the rollers 10 permits the chain to bend around the sprocket, but the pintles are so held that they cannot revolve and thereby wear the pin. The U-shaped parts of the pin are substantially in contact with the pintles and they lie flat against the adjacent plate 18, and since they project in opposite directions they prevent the pin from turning in its sockets 21 and from moving endwise relative to the pintles. The straight central portion 26 of the pin serves to connect the two U-parts 24 and 25, and it resists bending of the inner arms of the U-parts. Various other advantages will be apparent to one skilled in the art.

It will now be appreciated that the above disclosure is intended to explain the principles underlying my invention and to give a full description of a preferred embodiment thereof but without imposing limitations on the appended claims.

I claim:

1. A roller drive chain comprising a series of connected drive units, each of which has a pair of spaced side links, axially parallel bushings connecting the links and a roller mounted on each bushing, and a link, pintle and cotter pin assembly which holds two units connected, comprising pintles pivotally mounted within and projecting outwardly at both ends from the bushings of adjacent units, two outer links pivotally mounted on the outwardly projecting pintle ends and connecting the same, means for holding one outer link on the pintles, the pintles having axially aligned diametrical holes near their ends immediately outside of the other associated outer link, and a cotter pin shaped to provide two axially aligned end portions mounted in said holes and two U shaped arms between the end portions which extend in opposite directions and lie flat against said associated outer link in contact with the opposed pintles and so prevent both endwise movement and rotation of the pin relative to the pintles, whereby the pin holds the pintles permanently and non-rotatively assembled relative to said associated link.

2. A roller drive chain according to claim 1 in which the cotter pin is a steel wire shaped to provide an intermediate straight portion aligned axially with its end portions and the two U shaped arms are located between the end portions of the pin and the intermediate straight portion and on opposite sides of the latter, and wherein the pintles have heads at their ends remote from the cotter pins which prevent removal of the adjacent outer link.

EMIL E. PERRON.

References Cited in the file of this patent

UNITED STATES PATENTS

| Number | Name | Date |
|---|---|---|
| 2,231,380 | Belcher | Feb. 11, 1941 |